Figure 1:
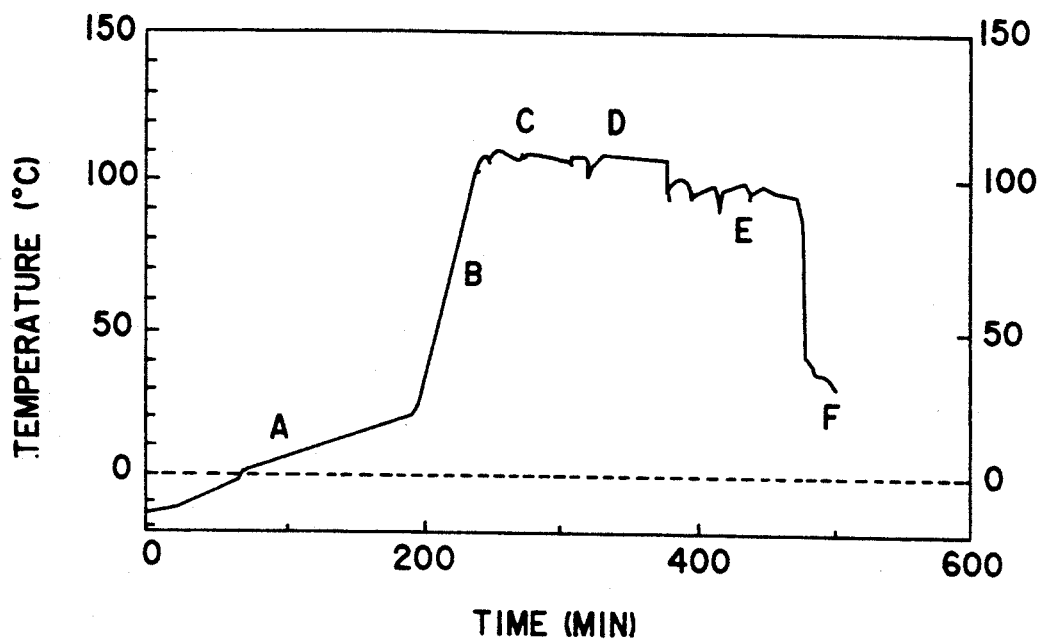

United States Patent

Garoff et al.

[11] Patent Number: 5,234,879
[45] Date of Patent: Aug. 10, 1993

[54] METHOD FOR THE MODIFICATION OF CATALYSTS INTENDED FOR THE POLYMERIZATION OF OLEFINS

[75] Inventors: Thomas Garoff, Helsinki; Timo Leinonen, Hamari; Eero Iiskola, Porvoo, all of Finland

[73] Assignee: Neste OY, Porvoo, Finland

[21] Appl. No.: 983,285

[22] Filed: Nov. 30, 1992

Related U.S. Application Data

[63] Continuation of Ser. No. 801,229, Dec. 3, 1991, abandoned.

[30] Foreign Application Priority Data

Dec. 19, 1990 [FI] Finland ................. 906282

[51] Int. Cl.$^5$ .............................................. C08F 4/649
[52] U.S. Cl. .................... 502/107; 502/104; 502/111; 502/125; 502/127; 526/125
[58] Field of Search ............... 502/104, 107, 111, 125, 502/127

[56] References Cited

U.S. PATENT DOCUMENTS

| | | |
|---|---|---|
| 4,473,660 | 9/1984 | Albizzati et al. ............... 502/123 |
| 4,581,342 | 4/1986 | Johnson et al. ................ 502/127 |
| 4,950,630 | 8/1990 | Murata et al. . | 
| 4,959,427 | 9/1990 | Furuhashi et al. . |

FOREIGN PATENT DOCUMENTS 273693 7/1988 European Pat. Off. .
WO90/09402 8/1990 World Int. Prop. O. .

OTHER PUBLICATIONS

Chien et al; *J. Polymer Science Part A: Polymer Chemistry*, 28, No. 1, pp. 273–284 (Jan. 1990).

Primary Examiner—Patrick P. Garvin
Assistant Examiner—Brent M. Peebles
Attorney, Agent, or Firm—Armstrong, Westerman, Hattori, McLeland & Naughton

[57] ABSTRACT

When asymmetric olefins or a monomer mixture containing asymmetric monomers is polymerized by a catalyst composition containing esters of carboxylic acid e.g. as a so-called donor, and alcohol the ester group can be transesterified with the alcohol to an ester containing another alkyl group during the preparation and/or polymerization of the catalyst. This is advantageous particularly when an adduct of a so-called spray-crystallized Mg-halide and alcohol is used as the catalyst carrier, because the alkoxy group of the alcohol of the carrier and the alkoxy group of the ester of the donor can be transesterified and thus obtain the preferable effects of both esters on the run of the polymerization reaction. Hereby, a solvent having a high boiling point should be used as the intermediate agent, so that the transesterification reaction can take place. Most preferable have been found hydrocarbons having high boiling points, especially nonane and decane.

14 Claims, 2 Drawing Sheets

METHOD FOR THE MODIFICATION OF CATALYSTS INTENDED FOR THE POLYMERIZATION OF OLEFINS

This application is a continuation of application Ser. No. 07/801,229 filed Dec. 3, 1991, now abandoned.

The invention relates to a method for the preparation of catalyst compositions containing an ester of carboxylic acid for the polymerization of olefins.

Olefins, particularly alpha-olefins, are often polymerized by the aid of an catalyst composition, in which the catalyst is formed by a compound of a transition metal of the groups IV-VI of the periodic table and its by reduction activating metal compound of any of the metals of the groups I-III of the periodic table i.e. a cocatalyst. This so-called Ziegler-Natta catalyst composition has been further developed by using an inert carrier as the support of the transition metal on which the transition metal compound is layered in the aim of thus improving the activity of the catalyst when it is catalyzing the polymerization reaction.

Yet, due to the influence of this composition the asymmetrical olefin monomers are quite often polymerized to various kinds of stereoisomeric polymers and mixtures of isotactic, atactic and syndiotactic polymers are obtained, in which the desired stereoisomer must be separated by means of often troublesome washing etc. stages. When a polymer of mainly of a certain stereospecific form is wanted to be prepared, e.g. an isotactic polyolefin from asymmetric olefin monomer, the influence of the catalyst on the stereospcificity of the product to be obtained has been improved by adding to the catalyst composition a donor compound, which due to a certain kind of steric structure contributes to the settling of the monomer molecule in a certain position on the catalyst particle at the end of the growing polymer molecule thus giving a certain stereoisomeric structure to the molecule chain of the polymer and making the polymer product obtained more or less such as desired.

There are two possibilities of adding a donor to the catalyst composition: already to the mixture of the transition metal compound and the carrier is added a so-called internal donor or only to the mixture of the monomer and the catalyst component in the polymerization reactor when adding the cocatalyst is added a donor, whereby it is spoken of an external donor. It is, of course, also possible to use a donor compound at both stages, whereby the donor can be a similar or a different kind of a compound at the various stages.

For asymmetric monomers i.e. monomers that can be stereo-specifically polymerized count all but ethylene, all side groups of the two carbon atoms saturated by which are hydrogens, and the most rarely occurring case that all the side groups are similar, e.g. tetramethylethylene. The certain stereospecific form is desirable due to the fact that the properties of the obtained polymer more beneficial for a certain purpose, e.g. the isotactic polyolefins crystallize better, their bulk density is greater, their mechanical properties are better, thus they are more durable, etc. The adhesion i.e. the adhesion properties of the atactic form are generally better as in other tactic forms and they are then suitable e.g. for adhesive applications.

When polymerizing asymmetric olefin monomers, i.e. when the groups attached to the carbon atoms joined by an unsaturated bond are different, at least as far as one group is concerned, the catalyst composition can comprise a compound improving the stereospecifity of the catalyst, i.e. an electron donor, which as an electron deliverer easily can engage to the rest of the structure of the catalyst and due to its steric influence direct the monomer molecule joining the polymer chain to such a position that the created polymer molecule is in a certain way stereospecific as to its structure. A great number of various organic compounds count on such donors e.g. esters, carboxylic acids, alcohols, ketones, aldehydes, nitriles, amides, amines, organic phosphorus and silicon compounds, etc. These compounds also have other influences on the properties of the catalyst, e.g. the activity of the catalyst varies depending on the donor used. If the donor is an ester of carboxylic acid, usual are esters of aromatic carboxylic acids, e.g. benzoates, phthalates, toluates, anisates, etc. Of these, preferable donors are dialkylphthlates, particularly disobutylphthalate, which also improves the activity of the catalyst, and diethylphthalate, for which it is typical that almost pure isotactic product is obtained.

As appears from the previous description of prior art, by means of the components of the catalyst composition is obtained, depending on the quality, either an active or a stereospecific catalyst composition. Thus, one goal is to obtain a catalyst composition having both a high activity and a high stereospecificity.

The above-mentioned goal has been achieved by the present invention which is mainly characterized by what is said in the characterizing clause of claim 1. It has thus been realized that the aim set is achieved by transesterification of the ester of carboxylic acid used as a component of the polymerization catalyst during the preparation of the catalyst and/or the polymerization, when olefins are polymerized by means of a catalyst composition containing esters of carboxylic acids. Particularly an ester component contained in a catalyst composition as a so-called electron donor is transestrified in the invention with the intention to improve the stereospecificity of the polymer obtained. Moreover, the invention relates to a method for the preparation of olefins, particularly, polypropylene, by means of such a catalyst composition, in which an ester of carboxylic acid, e.g. an electron donor, which is transesterified during the preparation and/or the polymerization of the catalyst, is contained in the catalyst.

It has thus been observed that by changing the alcohol group of the ester during the preparation and/or polymerization of the catalyst the different influences of the donor on the course of the polymerization reaction can be utilized.

Transesterification can under normal preparation and using circumstances be carried out by choosing a carboxylic acid ester—alcohol pair which are spontaneously transesterified under the circumstances mentioned.

Often it is, however, necessary to use elevated temperature to achieve transesterification. Hereby, the intermediate mediums and reagents often boil at such low a temperature that transesterification does not occur yet. According to one embodiment of the invention so high a temperature and an intermediate agent boiling at so high temperatures are used that a transesterification reaction succeeds.

Since the boiling point of liquid TiCl$_4$ is 136° C. at normal pressure, the titanization can normally be carried out only at a temperature lower than that. As usually hydrocarbon solvents, such as heptane, hexane or pentane, the boiling point of which are considerably lower, are used as titanization intermediate agents the titanization temperature remains in practice below 100° C. at which temperature no transesterification takes place. Accordingly, in order to achieve transesterification preferably liquids having a higher boiling temperature should be used, e.g. nonane (b.p. 151° C.) and decane (b.p. 174° C.) are recommendable. Hereby, one can come closer the boiling point of TiCl$_4$ and even pass it as a titanization temperature, whereby the transesterification reaction becomes possible.

Transesterification preferably takes place, when a spray-crystallized or emulsion solidified carrier is in question, as follows: a spray-crystallized or emulsion solidified adduct MgCl$_2$*nR$_1$OH, in which n is 1–6, is treated with a transition metal compound e.g. is titanized with TiCl$_4$, whereby, apparently, the following reaction takes place:

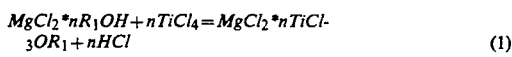

$$MgCl_2*nR_1OH + nTiCl_4 = MgCl_2*nTiCl_3OR_1 + nHCl \qquad (1)$$

When the donor, i.e. an ester of carboxylic acid, is added to this titanized carrier, an adduct consisting of all the components is created:

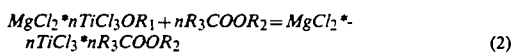

$$MgCl_2*nTiCl_3OR_1 + nR_3COOR_2 = MgCl_2*nTiCl_3*nR_3COOR_2 \qquad (2)$$

When this adduct can be transesterfied at a temperature higher than 136° C., i.e. above the boiling point of TiCl$_4$, the ester groups R$_1$ and R$_2$ exchange places:

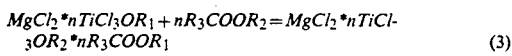

$$MgCl_2*nTiCl_3OR_1 + nR_3COOR_2 = MgCl_2*nTiCl_3OR_2*nR_3COOR_1 \qquad (3)$$

When the residue material of the catalyst is removed by extraction, an adduct of the carrier and the ester donor is obtained, in which the group originating from the alcohol of the ester has been exchanged.

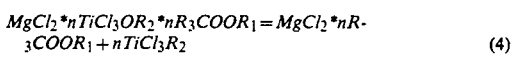

$$MgCl_2*nTiCl_3OR_2*nR_3COOR_1 = MgCl_2*nR_3COOR_1 + nTiCl_3R_2 \qquad (4)$$

In the method according to the invention compounds of many various kinds are used as the transition metal compound. The most common are the compounds of titanium, either organic or inorganic, and which are at the oxidization stage 3 or 4. Of other transition metals can be mentioned vanadium, zirconium, chromium, molybdenum, tungsten, and many so-called rare earth metals. The transition metal compound usually is halide or oxyhalide, an organic metal halide or a purely metal organocompound, i.e. only organic ligands have been attached to the transition metal. The halides of titanium are particularly preferable, expressly TiCl$_4$, and the alkoxides and alkoxyhalides of titanium.

Many kinds of compounds are also used as cocatalysts. The most usual metal is aluminium, but alkali metals Li, Na, K, earth-alkali metals and earth metals other an Al can come into question. The compounds are most usually hydrides, metal organic or halides, the most usual being Al-trialkyls, -alkylhalides, -alkoxides, alkoxyhalides and -halides particularly Al-chlorides.

The carrier principally is inert, i.e. it does not, in itself, influence on the polymerization reaction, but when the catalyst particles settle on the surface of the carrier, which a good carrier compound has a lot of, the monomer molecules are offered a greater possibility to polymerize. The carrier is either an organic compound, e.g. a conventional or a more special polymer, or inorganic, e.g. an oxide of numerous metals, such as silicon oxide or silica, Al-oxide or alumina, Ti—, Mg—, Cr—, Ba—, Th—and Zr-oxide, various silicates, various halides, e.g. CaCl$_2$, and above all Mg-halides, especially MgCl$_2$. An inorganic carrier can also be a metal hydroxide, or a metal hydroxyhalide as well as a more special compound, which generally has not had any great significance in practice, with the exception of some quite specific cases. Naturally, various combinations of various carriers come into question, particularly cogels of silica and other oxides are usual, and a significant combination is that of silica and MgCl$_2$, e.g. by letting silica absorb a solution or slurry containing MgCl$_2$.

As, due to the replica phenomenon, the physical structure of the catalyst carrier is repeated in the whole catalyst composition and this then in the polymer product obtained. It is very important to make the physical structure or the morphology of the carrier advantageous i.e. similar to the desired product. This can be achieved by using mainly two different processes, which can, of course, also be combined: chemically, i.e. by treating the carrier with certain chemical or chemicals, or physically, i.e. by grinding the carrier in a ball mill or a spray-blowing mill. Also a method can be used in which an adduct of the carrier, in this case expressly MgCl$_2$, and alcohol, e.g. ethanol, is first prepared, which is melted, the melt is sprayed by means of gas to cold solvent or cold gas, whereby the adduct is crystallized morphologically to a preferred form, and this crystalline adduct is used as a catalyst carrier (see FI-862459).

In the following we present as an example a polymerization method for olefins, in which propane is polymerized with a catalyst composition, in which spray-crystallized MgCl$_2$*3EtOH adduct is used, which then has been titanized with TiCl$_4$ in a hydrocarbon solvent in the presence of di-i-butylphthalate (DIBP). The monomer mentioned was polymerized by means of this procatalyst together with trialkyl-Al-cocatalyst as well as an external donor (e.g. cyclohexylmethoxy methylsilane CMMS). If a titanization temperature high enough is used, a transesterification reaction takes place between the ethoxy groups originating from the carrier adduct and the i-butyl groups of the donor, and the donor compound created is diethylphthalate (DEP). In this way it is possible to utilize in the same process the high catalyst activity caused by the di-isobutyl phthalate (DIBP) and the high isotacticity of the polypropylene created caused by DEP. Although the following examples only describe the polymerization of a certain monomer by means of a certain catalyst composition, it is obvious that it is possible to use this transesterification reaction also for the modification of other ester components of a catalyst and that you can get the possibility to utilize the effects brought forth by the difference of these ester components on the run of the polymerization reaction. Accordingly, it must not be considered that the following examples restrict the inventive idea contained therein.

The experimental arrangement when preparing the catalyst was the following, and during the experiment the temperature changed according to FIG. 1 (the references A to F in the text refer to this temperature gradient figure): 0.1 moles of MgCl$_2$*3EtOH adduct was mixed in 150 ml of hydrocarbon solvent. At the temperature of −15° C. 300 ml of TiCl$_4$ was added. The components were allowed to react during a slow rise of the temperature (A). At the temperature of +20° C. 5.7 ml of DIBP donor was added. The temperature rose to the level (B) and on the temperature levels (C) and (D) two titanizations were carried out. Then a hydrocarbon wash (E) and a dry wash (F) followed.

Figure 2:
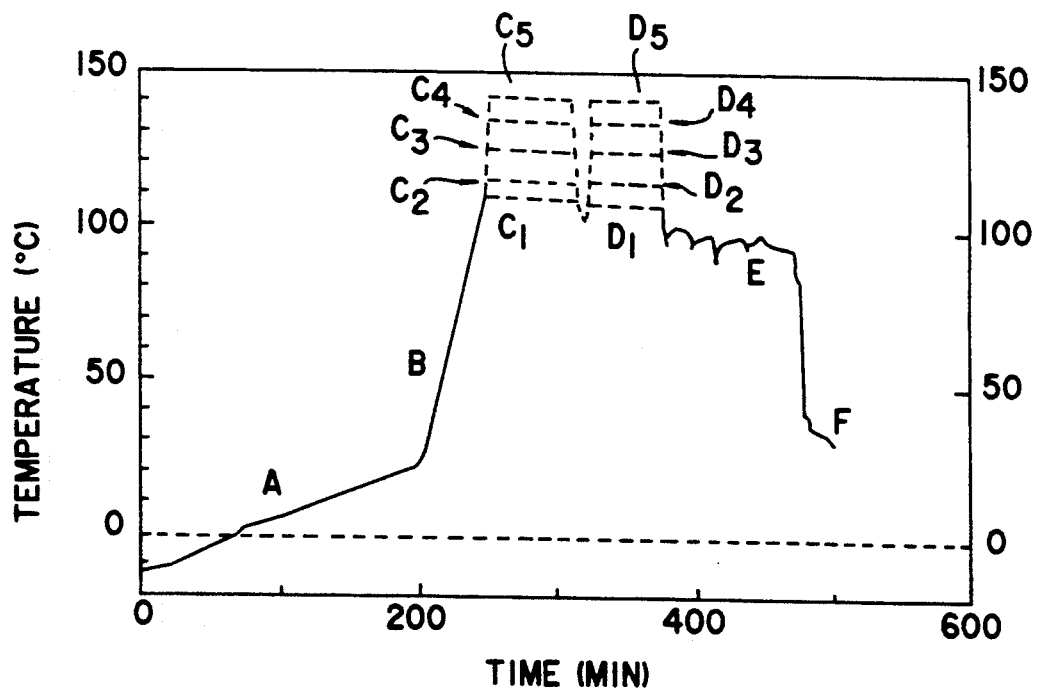

In order to examine the effect of the titanization temperature, a series of experiments was carried out, in which the temperature levels C and D were alternated, whereby the intermediate agent was nonane ($C_1$-$C_4$) and decane ($C_5$) and the temperatures correspondingly 110° C., 115° C., 125° C., 135° C., and 143° C. The changes in the temperature gradient curve are presented in FIG. 2.

The test polymerization with the catalysts obtained were carried out as follows: To a bank reactor of 2 liters was fed 25 to 30 mg of procatalyst, 0.62 ml of triethyl-Al, 0.20 ml of 25% CMMS solution (the external donor) dissolved in 30 ml of heptane. The polymerization was carried out in 3 hours at a temperature of 70° C. and in a propane pressure of 10 bars. The partial pressure of hydrogen during the polymerization was 0.2 bars.

The activity of the catalyst and the properties measured from the polypropylene obtained (the bulk density, the particle size distribution, the isotacticity) are presented in table 1, when the catalyst has been prepared using heptane or nonane as intermediate medium. The activity has been measured on the basis of the polymer yield, the isotacticity has been obtained by dissolution determination and the isotacticity index has been calculated by combining this result with the evaporation residue test result and the melt index has been measured at 230° C. during 10 minutes with a load of 2.16 kg. The determination of the molecular weight was carried out with a GPC-equipment.

TABLE 1

| Property | Intermediate medium in the preparation of the catalyst | |
|---|---|---|
| | Heptane (comparison) | Nonane |
| Catalyst | | |
| Total yield (g) | 14.8 | 12.7 |
| Bulk density (g/ml) | 0.44 | 0.44 |
| Ti-content | 4.4 | 3.2 |
| Activity (kgPP/g cat) | 14.3 | 14.3 |
| Activity (kgPP/g Ti) | 325 | 447 |
| Polypropylene | | |
| Isotacticity index (%) | 98.8 | 99.4 |
| Bulk density (g/ml) | 0.44 | 0.44 |
| Melt index | 10.0 | 5.5 |

It can be seen from this table that independent of the hydrocarbon intermediate agent the properties of the catalyst and the properties of the polypropylene obtained through it are almost identical. The differences that were obtained are exactly those that were desired: the activity towards titanium increased and the melt index decreased (this means narrowing of the molecular weight distribution) the isotacticity increasing, however, a little.

The effect of the titanization temperature on the total yield of the polypropylene and the bulk density as well as the titanium content of the catalyst was examined in the above-described method for the preparation of a catalyst, whereby the results presented in table 2 were obtained.

TABLE 2

| Titanization temperature (°C.) | Total yield of catalyst (g) | Bulk density of catalyst | Ti-content of catalyst (%) |
|---|---|---|---|
| 110 | 12.7 | 0.44 | 3.2 |
| 115 | 14.0 | 0.44 | 3.8 |
| 125 | 11.7 | 0.53 | 2.1 |
| 135 | 9.4 | 0.50 | 2.3 |
| 143 | 7.9 | 0.46 | 2.4 |

It can be seen from this table that the titanization temperature has an optimum point in regard to the above-mentioned variables, which can be used when olefins are polymerized by means of a Ziegler-Natta-catalyst, when the ester component of a catalyst composition is modified by transesterification.

Also the activity of the catalyst and the changing of the isotacticity index of polypropylene obtained therethrough was examined in the manner described above. Hereby, the results presented in table 3 were obtained.

TABLE 3

| Titanization temperature (°C.) | Activity kg PP/g Ti | Isotacticity index (%) |
|---|---|---|
| 110 | 447 | 98.9 |
| 115 | 359 | 98.9 |
| 125 | 852 | 97.9 |
| 135 | 843 | 99.1 |
| 143 | 413 | 97.0 |

Also now the optimum point can be noticed between the titanization temperature and the activity of the catalyst and correspondingly the isotacticity of the polymer obtained.

The X-ray spectrum examinations, which illustrate the amorphousness of the $MgCl_2$, show that a high titanization temperature causes transesterification, which can be seen in the $MgCl_2$'s aptitude to recrystallize. In table 4 is presented the alteration of the breadth of the crystals when the titanization temperature is increased.

TABLE 4

| Breadth of the polypropylene crystals as a function of titanization temperature | |
|---|---|
| Titanization temperature (°C.) | Breadth of the crystals (nm) *) |
| 110 | 6.0 |
| 115 | 5.4 |
| 125 | 6.7 |
| 135 | 8.4 |
| 143 | 8.5 |

*) Determined by X-ray measurements by angle 2 0 = 50°.

For the sake of comparison, when heptane was used as intermediate agent in the preparation of the catalyst, when the results of table 4 had been obtained by using nonane as intermediate agent, the breadth of the crystals obtained at 50° was 4.5 nm.

Figure 3:
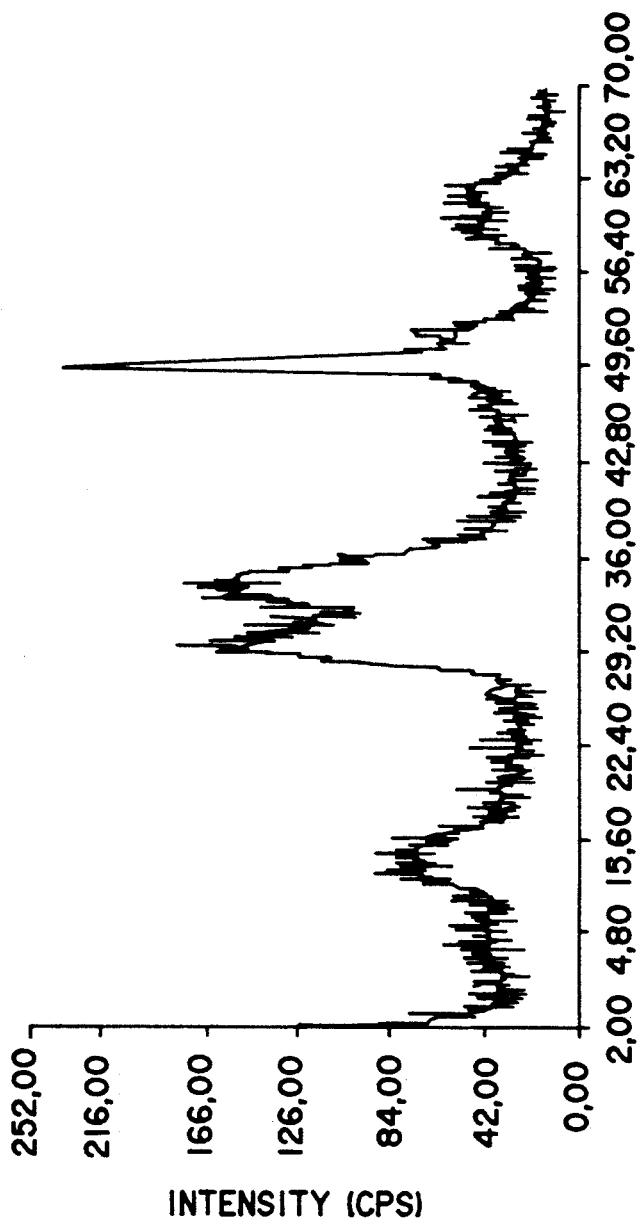

The X-ray diffraction obtained presents a much more crystalline catalyst material than what is obtained in the normal synthesis of a Ziegler-Natta catalyst. Moreover, the 15° signal is partly divided into two so that a new signal is obtained at 13° (FIG. 3). This X-ray diffraction is characteristic of a transesterified Ziegler-Natta catalyst. Normally, according to the X-ray diffraction, a catalyst determined as being so crystalline does not have much activity.

When determining the molecule weight distribution the result presented in table 5 were obtained.

TABLE 5

The molecule weight determinations of polypropylene as a function of titanization temperature

| Titanization temperature (°C.)/medium | $M_n$ | $M_w$ | $M_v$ | Polydispersity $D = M_w/M_n$ |
|---|---|---|---|---|
| 110/heptane | 85900 | 286000 | 242000 | 3.3 |
| 110/nonane | 95200 | 297000 | 269000 | 3.5 |
| 115/nonane | 103600 | 348000 | 293000 | 3.4 |
| 125/nonane | 93200 | 340000 | 280000 | 3.7 |
| 135/nonane | 122600 | 461000 | 379000 | 3.8 |

It can be seen from this table 5 that the changes are insignificant and the transesterification does not change the catalyst's influence, at least not to worse.

The influence of the above-mentioned catalyst's titanization temperature on the usability time (lifetime) was measured so that it was determined how much the activity of the catalyst had decreased in percentages within one hour from the preparation. The results are presented in table 6.

TABLE 6

The influence of the titanization temperature on the lifetime of the catalyst

| Titanization temperature (°C.) | Lifetime (%) |
|---|---|
| 110 | 54 |
| 115 | 33 |
| 125 | 74 |
| 135 | 52 |
| 143 | 82 |

The lifetime results scatter a lot, but the trend seems to be that, at least, the lifetime does not shorten, on the contrary it seems to become longer at high titanization temperatures.

Owing to the high titanization temperature a complete transesterification was achieved. The original donor (DIBP) disappears as a function of the temperature and a new donor (DEP) is born. By this transesterification method the total donor amount of the catalyst can be considerably reduced without, in spite of that, decreasing the stereospecificity of the catalyst.

Due to the transesterification the wash of the catalyst becomes more efficient. Normally, it is necessary to remove with manifold washing operations the last leavings of the sideproducts created in the preparation of the catalyst: TiCl3-ethoxide expressly attached to the most active points of the catalyst, but by the aid of transesterification this substance is changed to a donor, which, thus, is attached to the very appropriate point. The other component TiCl3OBu of the reaction is much more insoluble than the original ethoxy complex and thus the wash becomes more efficient.

We claim:

1. A method for the modification of a transesterified catalyst composition prepared from a MgCl2 carrier, a transition metal compound, a carboxylic acid ester and an alcohol, said composition being suitable for catalyzing a polymerization of an olefin, comprising
   transesterifying said carboxylic acid ester with said alcohol at a temperature of at least about 125° C.

2. The method of claim 1, wherein a medium having an elevated boiling temperature is employed as an intermediate agent in the preparation of the transesterified catalyst.

3. The method of claim 2, wherein said intermediate agent is a long-chain hydrocarbon.

4. The method of claim 3, wherein said long-chain hydrocarbon is nonane or decane.

5. The method of claims 1 or 2, wherein said ester component acts as an electron donor in said catalyst composition.

6. The method of claim 5, wherein said ester component is an alkyl ester of phthalic acid.

7. The method of claim 6, wherein said alkyl ester of phthalic acid is di-isobutyl phthalate.

8. The method of claims 1 or 2, wherein a carrier adduct is formed during transesterification, with said adduct comprising MgCl2 and an aliphatic alcohol.

9. The method of claim 8, wherein said adduct is MgCl2*nEtOH, with n being an integer of from 1 to 6.

10. The method of claims 1 or 2, further including a carrier, wherein an alkoxy group originating from an alcohol of said carrier is transesterified with an alkoxy group of said donor.

11. The method of claim 10, wherein said alkoxy group of said donor is an iso-butyloxy group, which is transesterified with an ethoxy group originating from said carrier.

12. A catalyst prepared according to the method of claims 1 or 2.

13. The catalyst of claim 12, whose x-ray diffraction spectrum includes signals at points 32.5 and 30, such that a ratio of said signals equals 1.

14. A catalyst prepared according to claims 1 or 2, whose x-ray diffraction spectrum includes a signal at 15 which is divided into two signals, such that a new signal is created at point 13.

* * * * *